March 23, 1965 S. GILMAN ETAL 3,174,671

TAPE DRIVE MECHANISM

Filed June 3, 1963

INVENTOR.
SAMUEL GILMAN
ARNE M. HARJA
BY
Fulwider, Patton, Rieber
Lee, and Utecht
ATTORNEYS United States Patent Office 3,174,671

Patented Mar. 23, 1965

3,174,671
TAPE DRIVE MECHANISM

Samuel Gilman, Arcadia, and Arne M. Harja, San Gabriel, Calif., assignors to United Data Control, Inc., South El Monte, Calif., a corporation of Washington Filed June 3, 1963, Ser. No. 284,920
6 Claims. (Cl. 226—183)

This invention relates generally to improvements in tape drive mechanisms for magnetic recording and playback devices, and more particularly to a new and improved tape drive means for tape cartridges of the plug-in variety such as shown in copending application Serial No. 165,895, filed January 12, 1962, by Samuel Gilman, for Magnetic Tape Cartridge.

In magnetic recording and playback systems, it has been common practice to employ tape reels for supporting a length of magnetic tape which, by way of appropriate guide means, transport the tape past a magnetic transducer for recording, playback, erasing or the like. Such reel-type tape storage and transport means have not proved entirely satisfactory because of the unavoidable distortion introduced in recorded or reproduced signals, e.g., as a result of the variable torque requirements of the tape reeling system as the tape is directed from one reel to the other.

Difficulties encountered with reel-type mechanisms have led to the development of continuous loop tape cartridges, e.g., of the type set forth in the aforementioned application. In this type of cartridge, the tape is not carried on reels, but rather is deposited in a compartment and looped about a translationally fixed idler roller therein which is adapted to be selectively engaged by an external drive wheel. Such continuous loop cartridges also embody suitable means for guiding the tape past a magnetic transducer and maintaining adequate physical contact between the tape and transducer for proper recording, playback, or the like.

Unfortunately, a number of difficulties have been encountered with the tape drive mechanisms within such continuous loop cartridges. Such tape drive mechanisms should possess the desirable characteristics of low-tension for increased tape life, constant and accurately controlled speed for enhanced recording and playback quality, and also be both compact and relatively inexpensive to manufacture. Attempts to develop such tape drive mechanisms have generally resulted in devices which are deficient in one or more of these respects.

Accordingly, it is an object of the present invention to provide a new and improved continuous loop magnetic tape cartridge embodying a tape drive mechanism which overcomes the above and other disadvantages of the prior art.

Another object is to provide an improved low-tension tape drive means within a magnetic tape cartridge.

A further object of the invention is the provision of an improved low-tension tape drive mechanism within a continuous loop cartridge, wherein the tape drive mechanism is simple, compact, and relatively inexpensive to manufacture.

Still another object is to provide an improved low-tension tape drive means within a magnetic tape cartridge, wherein the tape drive means is capable of imparting constant and more accurate speed to the tape being transported.

Yet another object of the present invention is the provision of a rocker arm mechanism for transporting tape within a continuous loop tape cartridge, wherein a tape guiding idler roller within the cartridge may be selectively actuated to engage a translationally fixed drive wheel.

The above and other objects and advantages of this invention will be better understood by reference to the following detailed description and the accompanying drawings of an illustrative embodiment thereof, wherein.

Figure 1:
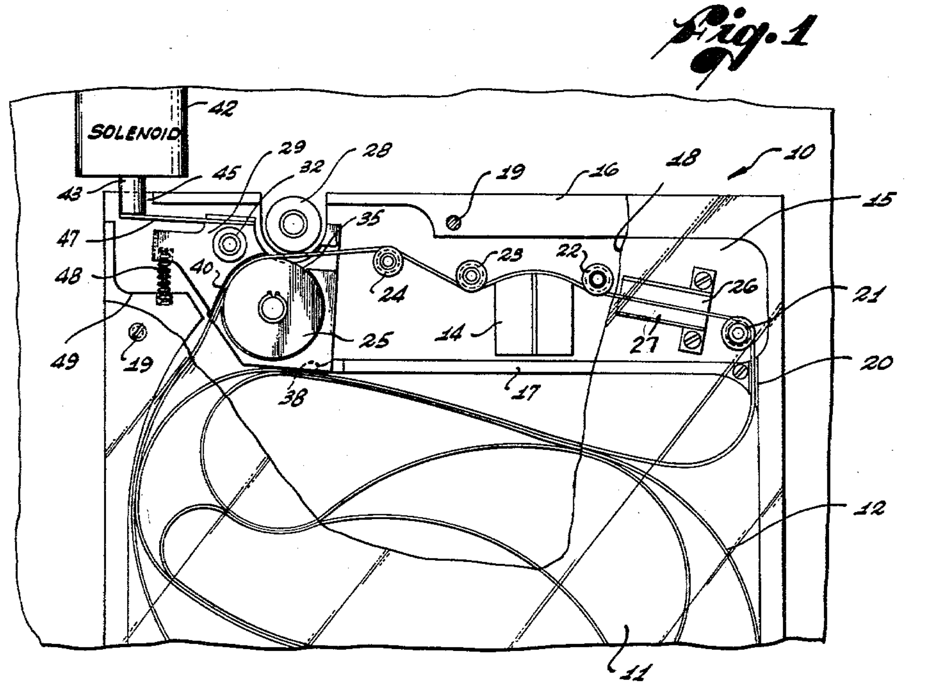
FIGURE 1 is a top plan view of a continuous loop magnetic tape cartridge, portions being broken away, embodying a selectively actuated rocker arm tape drive mechanism in accordance with the present invention.

Referring now to the drawings, and particularly to FIGURE 1 thereof, the numeral 10 designates a magnetic tape cartridge adapted for random storage of a single loop of continuous magnetic tape 12 within a sealed compartmented structure. The cartridge 10 includes a casing 16 fabricated of any suitable rigid structural material, and preferably of a non-magnetic metal such as aluminum or the like. The casing 16 houses the various structural components of the cartridge 10 and includes a wall 17 which divides the casing into a tape storage compartment 11 and a recording and tape transport compartment 15.

Figure 3:
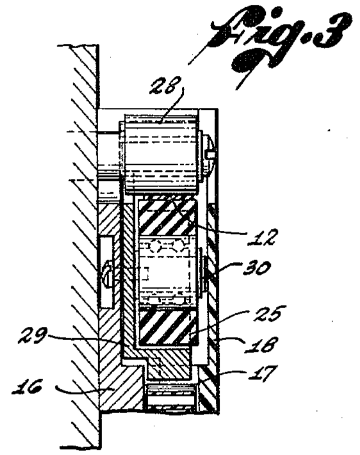
FIGURE 3 is a fragmentary sectional view, taken along the line 3—3 of FIGURE 2, and illustrates the relative dimensions of the tape and cartridge cross sections.

A cover plate 18 is provided for the cartridge 10 and is secured to the casing 16 by any suitable fastening means, such as the screws 19. The manner in which the casing 16 cooperates with the cover plate 18 to seal the cartridge 10, as well as the details of guiding and storing the continuous loop tape 12 in a randomly folded fashion within the storage compartment 11, are adequately set forth in the aforementioned application Serial No. 165,895, and, accordingly, no further discussion of these structural features need be presented here. However, it will be noted in FIGURE 3 that the internal width of the cartridge 10, with the cover plate 18 installed upon the casing 16, is substantially equal to the width of the tape 12, and the major structural components of the cartridge are essentially coplanar.

The cartridge 10 carries a magnetic transducer assembly 14 within the recording and tape transport compartment 15. Also within the compartment 15 are a low-tension tape drive mechanism and appropriate guiding means for transporting the tape 12 past the tranducer 14 and maintaining the tape in physical engagement with the transducer for recording, playback or erasing.

The tape 12 enters the tranducer and tape transport compartment 15 by way of a slot 20 in the casing wall 17 at the right side of the compartment, the slot communicating the tape storage compartment 11 with the tape transport compartment 15. The width of the slot 20 is such as to permit free passage of the tape 12 without binding or jamming. In this regard, the slot 20 must not be so wide as to allow the tape 12 to accumulate or buckle within the slot yet must be sufficiently wide to pass a splice (not shown) between the two ends of tape. In actual practice, a slot width of approximately 1½ to 3 times the thickness of the tape 12 has proven to be satisfactory.

Upon entering the tape transport compartment 15 by way of the slot 20, the tape 12 passes around a guidepost 21, across the right-hand portion of the compartment 15 to a guidepost 22 and the magnetic transducer 14, past the transducer and around a guidepost 23, to and around another guidepost 24, and thereafter to and around a tape guiding pressure roller 25 located at the left side of the tape transport compartment. Although the elements 21–24 have been referred to as "guideposts," it is to be understood that rollers may be substituted for any one or more of the guideposts 21–24 without in any way departing from the spirit and scope of the present invention.

A pair of resilient pressure pads 26, 27 are provided in the tape transport compartment 15 between the guideposts 21 and to impart a controlled amount of drag to the tape 12 as it passes through the transport compartment. By altering the pressure of the pads 26, 27 upon the tape 12, and fabricating the pads of materials having different coefficients of friction with magnetic tape, the amount of tension imparted to the tape as it passes through the transport compartment may be varied for different cartridges, e.g., those designed for operation at different recording speeds.

The magnetic transducer 14 is positioned within the compartment 15 so that it contacts the underside of the tape 12 as the tape passes the transducer. By virtue of the relative location of the transducer 14 and guideposts 22, 23, the tape 12 is maintained in proper physical contact with the transducer for recording, playback or erasing.

The tape guide roller 25 is an idler pressure roller, preferably of resilient material having a relatively high coefficient of friction with magnetic tape, such as rubber or the like, and performs the dual function of guiding the tape 12 from the tape transport compartment 15 back to the tape storage compartment 11 and also providing, in conjunction with an external drive wheel or capstan 28, a selectively actuated frictional drive for the tape.

The tape roller 25 is carried within a suitably recessed portion of a pivotal housing 29, and is adapted to rotate about a spindle 30 fixedly secured to the housing. The housing 29 is, in turn, adapted to pivot about a shaft 32 secured to the casing 16. Hence, the housing 29 and tape roller 25 may be pivoted as a single unit about the shaft 32 between the two positions shown in FIGURES 1 and 2.

Figure 2:
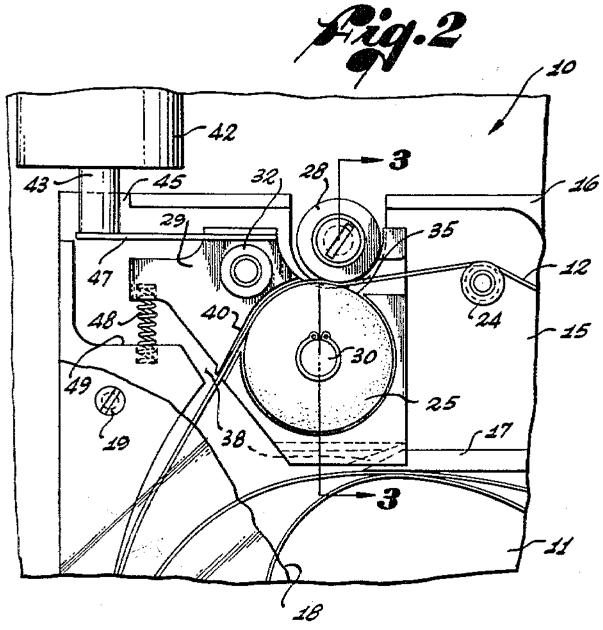
FIGURE 2 is a fragmentary plan view, similar to FIGURE 1, and shows the rocker arm tape drive mechanism actuated to engage a suitable drive wheel.

An opening 35 is provided in the upper wall of the housing 29, so that the tape 12 and tape roller 25 will physically engage the driving capstan 28 when the housing is pivoted to the position shown in FIGURE 2. In this latter positon, the tape 12 is pressed against the driving capstan 28 by the resilient pressure roller 25 to provide a pinch-roller drive arrangement for transporting the tape through the cartridge 10. On the other hand, when the housing 29 is pivoted to the position shown in FIGURE 1, the tape roller 25 no longer presses the tape against the capstan 28, and thus the tape instantly ceases its travel through the compartment 15.

A portion of the wall 17 of the casing 16 is removed at 38 to provide clearance for the housing 29 over its entire range of pivotal movement. More over, an exit slot 40 is provided in the left side wall of the housing 29 to permit the tape 12 to enter the tape storage compartment 11 after passing around the tape roller 25. One wall of the slot 40 is defined by the circumference of the roller 25 and is, therefore, a movable wall.

The housing 29 is selectively actuated from its pivotal positon shown in FIGURE 1 to its pivotal position shown in FIGURE 2 by means of an electrical solenoid 42, the plunger 43 of which extends into the tape transport compartment 15 through an opening 45 provided in the forward wall of the cartridge casing 16. To this end, the housing 29 is provided with an integral rocker arm 47 adapted for use as a lever in pivoting the housing about the shaft 32.

The plunger 43 of the solenoid 42 extends through the opening 45 in the casing 16 and biases the rocker arm 47 to either of the positions shown in FIGURES 1 and 2, depending upon the position of the solenoid plunger. Any well known electrical circuit means (not shown) may be employed to selectively actuate the solenoid 42 and thereby control the position of the plunger 43.

As shown in FIGURES 1 and 2, a small coil spring 48 is inserted between an inwardly projecting shoulder 49 of the casing 16 and the underside of the housing 29 below the rocker arm 47. The spring 48 biases the rocker arm 47 and housing 29 to the position of FIGURE 1 when the solenoid plunger 43 is retracted. However, when the solenoid plunger 43 is extended, the restoring forces of the spring 48 are overcome to bring the tape roller 25 and tape 12 into engagement with the driving capstan 28. The spring 48 also behaves as a resilient cushion which minimizes transmission of mechanical shock to the housing 29, roller 25, and capstan 28 when the solenoid plunger 43 is suddenly extended to rapidly pivot the housing to the position of FIGURE 2.

The rocker arm tape drive mechanism of the present invention also incorporates means for transporting the tape 12 at constant and more accurate speed. To enhance the constant speed characteristics of the tape drive mechanism, it will be observed in FIGURE 3 that both the capstan 28 and the resilient tape roller 25 are slightly wider than the tape 12. Consequently, when the tape roller 25 presses the tape 12 against the driving capstan 28, portions of the tape roller deform and squeeze over the edges of the tape to directly contact the driving capstan. Hence, there is a direct drive connection between the capstan 28 and the tape roller 25 which is essentially independent of the coefficient of friction between the tape 12 and either the capstan or the tape roller. This arrangement results in less slippage between the rollers and more constant tape speed.

Referring now particularly to FIGURE 2, means are illustrated for more accurately controlling the linear velocity imparted to the tape 12 by the pinch-roller drive arrangement. Engagement of the resilient tape roller 25 by the relatively non-resilient driving capstan 28 serves to distort or deform the tape roller inwardly of its normal outer circumference. The result of this roller deformation is that the tape roller 25 assumes a peripheral shape of non-uniform radius from its axis of rotation. Hence, the angular velocity imparted to the tape roller 25 by the driving capstan 28 is determined merely by the effective radius of the tape roller at the line of essentially tangential contact between the capstan and the tape roller. However, since the radius of the tape roller 25 is non-uniform, peripheral velocities at other points along its circumference, removed from the line of tangential contact between the tape roller and the capstan, may differ considerably from the peripheral velocity at the actual line of contact between the rollers.

In light of the above, it is preferred to control the angle of approach of the tape 12 to the intersection between the capstan 28 and the tape roller 25 so that the tape will contact the capstan before it contacts the tape roller. In this manner, the tape 12 does not contact the tape roller 25 until its arrival at the essentially tangential line of engagement between the tape roller and the driving capstan. Hence, variation of tape speed by virtue of excessive contact with the deformed tape roller 25 is avoided, and, since the angular and peripheral velocities of the driving capstan 28 are uniform, the linear velocity imparted to the tape 12 by the capstan 28 may be accurately controlled.

Subsequent wrapping of the tape 12 around the tape roller 25, after passing the line of tangential contact between the capstan 28 and the tape roller, has substantially no effect upon the linear velocity of the tape, since tape drive tension is essentially zero beyond the line of contact between the rollers. The pinch-roller driving arrangement formed by the rollers 25 and 28 imparts tension to the tape by pulling up to the line of contact between the rollers, but beyond this line of contact the rollers push rather than pull the tape.

To provide the proper angle of approach of the tape 12 to the line of intersection between the driving capstan 28 and the resilient tape roller 25, the guidepost 24 is positioned in the tape transport compartment to deflect the tape upwardly as it leaves the guidepost 23. Hence, when the solenoid 42 is actuated to place the tape driving mechanism in operation, the tape 12 will encounter the driving capstan 28 before it encounters and wraps around the tape roller 25. As previously indicated, this arrangement minimizes variation in tape speed due to distortion of the resilient tape roller 25 and consequent non-uniformity of peripheral velocities along the circumference of the tape roller.

Of course, it will be appreciated from FIGURE 1 that the guideposts 22, 23 and transducer 14 may be repositioned within the tape transport compartment 15 so that the tape 12 will leave the guidepost 23 at the proper angle of approach to the capstan 28 and tape roller 25 without the need for the additional guidepost 24. Moreover, it will also be apparent that the positions of the solenoid 42, rocker arm housing 29, and rollers 25, 28 may be reoriented within the cartridge 10 to provide a variety of different structural configurations. For example, the rocker arm 27 may be placed in any position within the cartridge 10 which is accessible by the solenoid plunger 43 for pivoting the housing 29, and the driving capstan 28 may engage the tape 12 and pressure roller 25 from any convenient direction. Furthermore, the driving capstan 28 may be housed directly within the cartridge 10 and provided with an external shaft coupling adapted to be engaged by a suitable drive mechanism.

The tape drive mechanims of the present invention have the additional advantage of possessing very low inertia characteristics in operation, since the primary inertia forces are merely those of the weight of the tape itself. Therefore, the drive system is constant speed, constant torque, and extremely positive in its action. Hence, complicated braking systems are not required, and wow and flutter distortion are substantially eliminated.

The rocker arm tape drive mechanisms of the present invention provide a compact, low-tension, low-inertia, simple and inexpensively manufactured tape drive means within a sealed magnetic tape cartridge unit. Moreover, the tape drive mechanisms of the present invention are characterized by ruggedness, high performance reliability, and extended tape life.

It will be apparent from the foregoing that, while particular forms of our invention have been illustrated and described, various modifications can be made without departing from the spirit and scope of our invention. Accordingly, we do not intend that our invention be limited, except as by the appended claims.

We claim:

1. A transport system for an endless information storage tape comprising information transducing head means, a storage bin for said tape, said bin having an inlet downstream of said head means and an outlet upstream of said head means, means positioned downstream of said head means for translating said tape past said head means and for forcing said tape through said inlet into said bin, without exerting tension, and only by pushing, said last named means including; a stationary capstan, a pinch roller pivotable about a fixed point for selectively engaging said capstan, means coupled with said pinch roller forming a constant width slot greater than the tape thickness by a predetermined amount, said slot forming means being moved so that said slot is pivotable about said fixed point with said pinch roller, said slot terminating approximately at the inlet of the bin, the circumferential edge of said pinch roller forming a portion of the wall of said slot, said portion being upstream of the slot termination, said tape passing between said capstan and pinch roller into said slot and through said slot into said inlet.

2. The tape transport system of claim 1 wherein the width of said slot is on the order of one and a half to three times the thickness of said tape at its thickest portion.

3. The tape transport system of claim 1 wherein said capstan is upstream of said pinch roller, said capstan and pinch roller being arranged so that said tape in passing between said capstan and pich roller tangentially contacts said capstan before said tape contacts said pinch roller.

4. A system for transporting an endless information storage tape past an information transducing head into a bin without exerting any tension on the tape as it enters an inlet of the bin comprising means positioned downstream of said head for forcing said tape through said inlet into said bin only by pushing, said means including; a stationary capstan, a pinch roller pivotable about a fixed pivot for selectively engaging said capstan, means coupled with said pinch roller forming a constant width slot greater than the tape thickness by a predetermined amount, said slot forming means being moved so that said slot is pivotable about said fixed point with said pinch roller, said slot terminating approximately at the inlet of the bin, the circumferential edge of said pinch roller forming a portion of the wall of said slot, said portion being upstream of the slot termination, said tape passing between said capstan and pinch roller into said slot and through said slot into said inlet.

5. In combination, an endless information storage tape, information transducing head means, a storage bin for said tape, means for feeding said tape from said storage bin past said head means and for feeding said tape into said bin without tension, said bin having an inlet downstream of said head means and an outlet upstream of said head means, said means for feeding including means positioned downstream of said head means for forcing said tape through said inlet into said bin only by pushing, said means for forcing including; a stationary capstan, a pinch roller pivotable about a fixed point for selectively engaging said capstan, means coupled with said pinch roller forming a constant width slot greater than the tape thickness by a predetermined amount, said slot forming means being moved so that said slot is pivotable about said fixed point with said pinch roller, said slot terminating approximately at the inlet of the bin, the circumferential edge of said pinch roller forming a portion of the wall of said slot, said portion being upstream of the slot termination, said tape passing between said capstan and pinch roller into said slot and through said slot into said inlet.

6. The combination of claim 5 wherein said tape, said head means, said storage bin, said pinch roller and said means forming a slot are all mounted in a single unitary cartridge, said capstan being mounted on a member for receiving said cartridge, said cartridge, when placed on said member, being positioned so that the capstan is upstream of said pinch roller, said tape passing between said capstan and said pinch roller so that said capstan tangentially contacts said tape before said tape contacts said pinch roller.

References Cited by the Examiner

UNITED STATES PATENTS

| | | | |
|---|---|---|---|
| 2,311,521 | 2/43 | Colburn | 226—183 X |
| 2,534,026 | 12/50 | Hurxthal | 226—183 X |
| 2,848,221 | 8/58 | Camras | 226—1 |
| 2,959,334 | 11/60 | Uritis | 226—176 |
| 2,990,092 | 6/61 | Begun et al. | 226—176 |
| 2,991,920 | 7/61 | Emslie et al. | 226—118 |
| 3,048,315 | 8/62 | Pankratz et al. | 226—118 |
| 3,097,777 | 7/63 | Floyd | 226—39 |

ROBERT B. REEVES, *Primary Examiner.*

RAPHAEL M. LUPO, WILLIAM B. LA BORDE, *Examiners.*